United States Patent
Lu et al.

(10) Patent No.: US 7,844,002 B2
(45) Date of Patent: *Nov. 30, 2010

(54) METHOD AND SYSTEM FOR MULTIPLE PASS VIDEO CODING

(75) Inventors: Ligang Lu, Somers, NY (US); Vadim Sheinin, Yorktown Heights, NY (US)

(73) Assignee: International Business Machines Corporation, Armonk, NY (US)

(*) Notice: Subject to any disclaimer, the term of this patent is extended or adjusted under 35 U.S.C. 154(b) by 74 days.

This patent is subject to a terminal disclaimer.

(21) Appl. No.: 12/131,268

(22) Filed: Jun. 2, 2008

(65) Prior Publication Data

US 2008/0225959 A1 Sep. 18, 2008

Related U.S. Application Data

(63) Continuation of application No. 10/665,228, filed on Sep. 17, 2003, now Pat. No. 7,408,984.

(51) Int. Cl.
*H04N 7/12* (2006.01)
*G06F 15/16* (2006.01)

(52) U.S. Cl. .................. 375/240.28; 709/247
(58) Field of Classification Search ............ 375/240.28, 375/240.03, 240.05; 709/247
See application file for complete search history.

(56) References Cited

U.S. PATENT DOCUMENTS

| | | | | |
|---|---|---|---|---|
| 5,612,900 | A | * | 3/1997 | Azadegan et al. ........... 709/247 |
| 5,719,632 | A | * | 2/1998 | Hoang et al. ........... 375/240.05 |
| 5,929,916 | A | | 7/1999 | Legall et al. |
| 5,978,029 | A | | 11/1999 | Boice et al. |
| 6,037,982 | A | | 3/2000 | Coelho |
| 6,037,985 | A | * | 3/2000 | Wong ................. 375/240.03 |
| 6,466,621 | B1 | | 10/2002 | Cougnard et al. |
| 6,925,120 | B2 | | 8/2005 | Zhang et al. |

* cited by examiner

*Primary Examiner*—Gims S Philippe
(74) *Attorney, Agent, or Firm*—Scully, Scott, Murphy & Presser, P.C.; Daniel P. Morris, Esq.

(57) ABSTRACT

A real-time MPEG video coding system with information look-ahead for constant bit rate (CBR) applications, such as, for example, Video-on-Demand (VoD) over ADSL. This scheme employs two MPEG encoders. The second encoder has a buffer to delay the input by an amount of time relative to the first encoder to create a look-ahead window. In encoding, the first encoder collects the information of statistics and rate-quality characteristics. An on-line information processor then uses the collected information to derive the best coding strategy for the second encoder to encode the incoming frames in the look-ahead window. The second encoder uses the encoding parameters from the processor as the coding guide to execute the coding strategy and generate the final bitstream.

6 Claims, 3 Drawing Sheets

Real-Time MPEG Video Coding with Information Look-Ahead

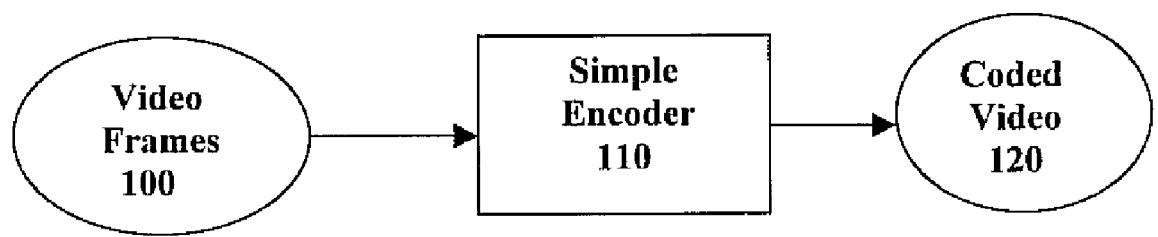
Figure 1 Conventional Video Encoder

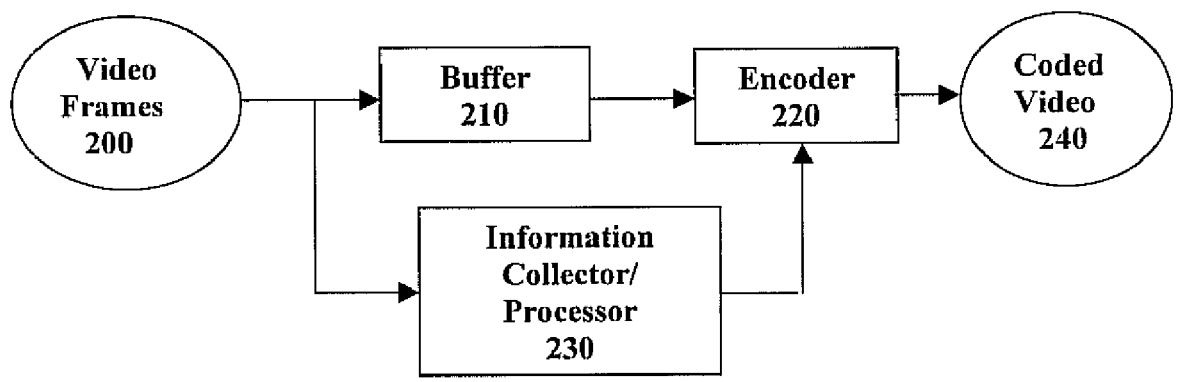
Figure 2 Video Coding with Information Look-Ahead

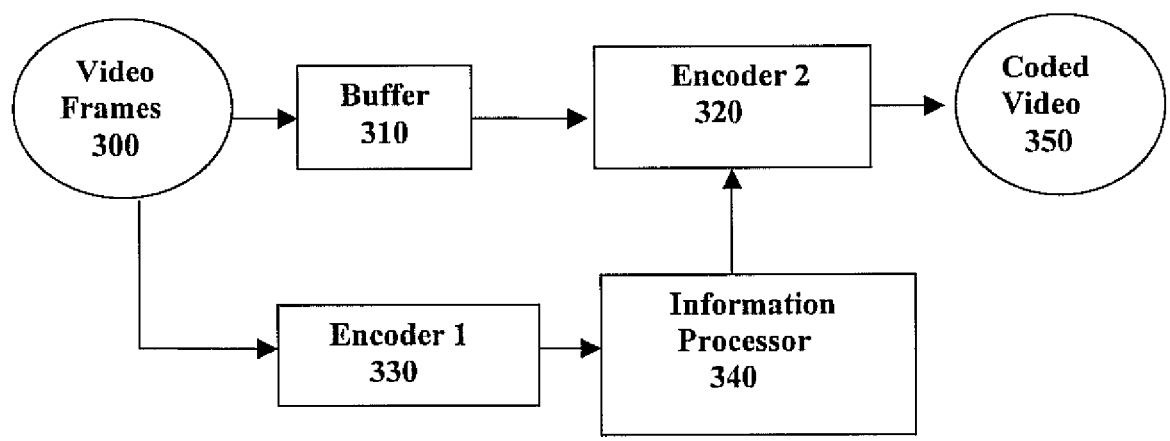
Figure 3. Real-Time MPEG Video Coding with Information Look-Ahead

METHOD AND SYSTEM FOR MULTIPLE PASS VIDEO CODING

RELATED APPLICATIONS

This application is a continuation of Ser. No. 10/665,228, now U.S. Pat. No. 7,408,984, filed on Sep. 17, 2003.

BACKGROUND OF THE INVENTION

1. Field of the Invention

The present invention relates generally to the field of data compression, and more specifically to a method and system for real-time multiple-pass data encoding, and particularly, for encoding video signals.

2. Description of the Prior Art

Digital video compression is an essential technology in video communications, broadcasting, and storage. MPEG video coding standards have been successfully used to reduce the transmission bandwidth and storage space requirements in many applications, such as digital TV broadcast through satellite and cable, Digital Video Disk (DVD), Video on-Demand and video streaming over the Internet, etc. However, emerging applications and new services become increasingly demanding for less transmission bandwidth and storage space. For example, in Video-on-Demand service over Asymmetric Digital Subscriber Line (ADSL), live news and sports events are transmitted in real-time to the subscribers using MPEG-2 video coding standard (ISO/IEC 13818-2) at a constant bit rate (CBR) in the range of 0.6 to 2 Mbits/second. For MPEG CBR video encoding at such a bit rate range, it is very challenging for the conventional MPEG encoders available on the commercial market to produce acceptable picture quality. Conventional MPEG encoders employ a single encoder scheme as depicted in FIG. 1. As shown in FIG. 1, the conventional video encoder device 110 implements a coding strategy which is based on the information retained in coding only the previous video frames 100 to provide coded video output 120. These encoders 110 routinely adopt a coding strategy that is only based on the information obtained in coding of the previous video frames 100 and/or rely on some assumed signal models to predict or estimate the signal properties of the current input frame to guide the encoding process of the current frame. However, natural video is a statistically non-stationary signal source. Prediction and estimation based on the past signal will not correctly describe the current input signal. In addition there is no known robust signal model that can describe the natural video signal reliably. Such encoders will not be able to determine and apply the best coding strategy to encode the incoming video frames for lack of the information about the current and future input frames. In order to meet the challenges from more demanding emerging applications, more sophisticated schemes for MPEG-2 video coding are needed to improve the performance and to ensure the quality of services.

Research efforts have been made to improve the variable bit rate (VBR) MPEG video coding, e.g., for DVD applications, by employing two-pass and re-encoding schemes. However, there are no published research results for multi-pass CBR coding in the literature.

It would thus be highly desirable to provide a real-time MPEG CBR video coding method and associated system that are able to jointly determine and apply the best coding plan to encode input video frames based not only on the information of the previous and current frames, but also the information about the future input frames.

SUMMARY OF THE INVENTION

According to one aspect of the invention, a system and method is provided for performing real-time multi-pass data encoding, in particular video signal multi-pass encoding.

According to another aspect of the invention, a system and method is provided for performing real-time video signal multi-pass encoding with information look-ahead.

According to a further aspect of the invention, there is provided a system and method for MPEG video coding with information look-ahead that utilizes two MPEG encoder devices. The first encoder device functions as an information collector, which information is then used by an on-line processor. Taking the advantage of the time delay between the inputs of the two encoder devices, the processor employs an efficient algorithm to jointly derive the best coding strategy for the all incoming frames in a look-ahead window by exploiting the information not only about the past and current frames but additionally the future frames. The second encoder, which operates at the same constant bit rate as the first encoder, uses the coding strategy from the processor as the guide to encode the incoming frames.

Advantageously, the system and method of the present invention may be applicable for encoding any type of digital information that can be divided into coding units having bits that may be allocated to the coding units for constant bit rate or variable bit rate encoding. For example, digital audio or digitized speech can be divided into frames in millisecond units. These frames can be treated the same as the video pictures and the invention can be applied to these coding units.

BRIEF DESCRIPTION OF THE DRAWINGS

The objects, features and advantages of the present invention will become apparent to one skilled in the art, in view of the following detailed description taken in combination with the attached drawings, in which:

FIG. 1 is a description of a conventional simple encoder system;

FIG. 2 illustrates an encoder system that has look-ahead information collection; and, FIG. 3 is a block diagram depicting a preferred embodiment for encoding digital data according to the present invention.

DETAILED DESCRIPTION OF THE PREFERRED EMBODIMENTS

As illustrated in FIG. 2, an information look-ahead mechanism is added to the conventional video signal encoder device of FIG. 1. That is, as shown in FIG. 2, video input frames 200 are fed in parallel to a buffer device 210 in front of the encoder device 220 and, an information collector/processor device 230. The buffer device 210 functions to delay the input video frames 200 by a fixed amount of time so that the information collector/processor 230 will have the operation time to extract useful information about the incoming frames in the delay buffer 210 and process the information to determine a coding strategy for encoding these frames. The determined coding strategy is then passed in the form of coding parameters to the encoder device 220 for execution.

In the video coding scheme depicted in FIG. 2, the buffer effectively creates a look-ahead time window for the information collector/processor to gather and process the information. Given the information and the processing algorithm executed in the information collector/processor device 230, the best coding plan may be determined jointly based on the information about the past, current, and future input video frames. However, to implement this video coding scheme in a cost effective way and to achieve efficient performance, it is necessary to first determine what appropriate look-ahead information to collect from the input frames and how to collect it, how the look-ahead information should or can be used to devise the best coding strategy (i.e., the processing algorithm) and how the coding strategy can be carried out, and what is the proper buffer size (or the look-ahead window size).

The most useful information for determining the best coding strategy for the incoming video frames are the signal statistics and characteristic variables, rate-quality measure, and coding parameters that are directly used in various steps of the encoding process with the dominant impact in the coding results. The most effective approach to collect such information is to use a collector that emulates the encoder operation. Therefore, in order to gather the most pertinent and useful information to derive the best coding strategy, a second MPEG encoder device is employed such as depicted in the block diagram of FIG. 3 illustrating the preferred system of the invention. In the system depicted in FIG. 3, two MPEG encoder devices 320 and 330 are provided that operate at the same CBR. Particularly, video input frames 300 are fed in parallel to a buffer device 310 and, a first MPEG encoder device 330 which functions as the information collector and feeds the processor device 340 which implements a processing algorithm executed within the information processor 340 which may be implemented in a general processor, a DSP chip, or reside on a host PC (not shown). The primary benefit of using the first MPEG encoder 330 as the information collector is that the direct signal information and intermediate results in various encoding stages can be obtained in the same encoding operation conditions as the intended encoding process. The exact items of information to be collected may depend on the need of the processing algorithm and the availability of the information in the encoder chip on the fly and the real-time output capability of the encoder device 330. In the preferred embodiment depicted in FIG. 3, information relating to the picture complexity, motion magnitude, and picture quality index are collected.

As an initial consideration, the length of the look-ahead window determines the input delay buffer 310 size. The more frames to look-ahead, the larger the buffer size and in turn the longer the delay. The cost also increases with the buffer size. For the convenience of bit allocation and rate control in CBR coding, the look-ahead window size is a predetermined multiple of the size of Group of Pictures (GOP) so that the numbers of Intra-coded (I), Predictive Coded (P), and Bi-direction Predictive Coded (B) frames in the look-ahead window are constants. Details regarding the MPEG encoding frames may be found in a reference entitled *Informaiton Technology—Generic Coding of Moving Pictures and Associated Audio:Video*, ISO/IEC 13818-2, 1995 incorporated by reference as if fully set forth herein. The look-ahead window size $W_s$ is thus determined to be:

$$W_s = K^* GOP_s$$

where K=1 or 2; $GOP_s$ is the size of Group of Picture in MPEG video coding. The input delay buffer size $B_s$, then becomes:

$$B_s = W_s + \Delta_p$$

where $\Delta_p$ is the information processing time which depends on the complexity of the algorithm.

Once the information about the video frames in the look-ahead window is available, the processing algorithm determines a coding strategy for these frames using the information. In the preferred embodiment, a target bit allocation plan for the video frames is jointly determined so that the available bits can be used efficiently and the decoding buffer defined as Virtual Buffer Verifier (VBV) in MPEG-2 standard can be exploited sufficiently. Assume there are N frames in the look-ahead window. Let $P_i$, i=1, . . . N, be the i-th frame in the window. The picture complexity, motion magnitude, picture quality index, and target number of bits for $P_i$ are denoted as $C_i, M_i, Q_i$ and $T_i$, respectively. With R representing the bit rate and F the frame rate, the algorithm performs the following steps:

A first step is to calculate the dynamic weighted picture complexity, $C_i'$ as:

$$C_i' = C_i W\left(\frac{M_i}{\overline{M}_i}, \frac{Q_i}{\overline{Q}_i}, S_i, D_i\right);$$

where W( ) is a real function; $S_i \in \{I,P,B\}$ is the picture coding type of frame $P_i$; $\overline{M}_1$ and $\overline{Q}_1$ are the average motion magnitude and average picture quality index of all frames in the look-ahead window with the same picture coding type as $S_i$; and $D_i$ is the distance from $P_i$ to the most recent I frame. It should be noted that the larger the value of $Q_i$, the worse the picture quality.

A second step is to jointly determine the target number of bits for all frames in the look-ahead window:

$$T_i = \frac{RNC_i'}{F\sum_{k=1}^{N} C_k'};$$

A third step is the step of determining rate control to prevent decoder buffer overflow and underflow: The variable "V" is denoted as the decoder buffer size (e.g., 1835008 bits for MP@ML (Main Profile/Main level) case) as defined in MPEG-2 standard (See *Informaiton Technology—Generic Coding of Moving Pictures and Associated Audio:Video*, ISO/IEC 13818-2, 1995) and $V_i$ is denoted as the decoder buffer fullness just before the picture $P_i$ is drawn from the decoder buffer for decoding. Letting "G" be a guard band, for example, G=3%~5% of V, the MPEG-2 decoder buffer model for CBR operation is described by the following recurrence:

$$V_0 = V_{init},$$

$$V_i = V_{i-1} + R/F - T_i,$$

where $V_{init}$ is the initial buffer fullness. To prevent any overflow and underflow, the buffer fullness must always satisfy the following relation:

$$T_i + G \leq V_i \leq V - G.$$

If $V_i$ underflow or overflow the buffer requirement by an amount of δ, then the target bit allocation must be adjusted according to the following:

$$T'_k = T_k \frac{\sum_{m=1}^{i} T_m \mp \delta}{\sum_{m=1}^{i} T_m}, k = 1, 2, \ldots, i;$$

$$T'_k = T_k \frac{\sum_{n=i+1}^{N} T_n \pm \delta}{\sum_{n=i+1}^{N} T_n}, k = i+1, \ldots, N.$$

Returning to FIG. 3, after the coding strategy is determined for the video frames in the look-ahead window, it needs to be passed to the second encoder device 320. This is preferably communicated in the form of the coding parameters and other necessary information. In practice, the real-time communication bandwidth between the second encoder device 320 and information processor 340 may limit the amount of the coding parameters and information to be transmitted to the encoder 320 on frame-by-frame basis and may have an impact on the execution of the coding strategy. In one of the embodiments of the invention, four (4) 16 bit integers are used to pass parameters to the second encoder 320 for every frame's encoding. They are 16 bits for the target number of bits, 16 bits for the weighted picture complexity, and 32 bits for the sum of the weighted complexities of the remaining un-encoded frames in the look-ahead window. The last two parameters are used by the second encoder 320 to reallocate any excess bits over the remaining frames.

While the invention has been described for MPEG video encoding, it is understood that the invention may be used with other video coding techniques or even with non-video data. Indeed, any digital information can be divided into coding units and bits are allocated to the coding units for constant bit rate or variable bit rate encoding. For example, digital audio or digitized speech can be divided into frames in millisecond units. These frames can be treated the same as the video pictures and the invention can be applied to these coding units.

While the invention has been particularly shown and described with respect to illustrative and preformed embodiments thereof, it will be understood by those skilled in the art that the foregoing and other changes in form and details may be made therein without departing from the spirit and scope of the invention which should be limited only by the scope of the appended claims.

Having thus described our invention, what we claim as new, and desire to secure by Letters Patent is:

1. A system for real-time multi-pass encoding of a sequence of video frames comprising:
    an input buffer implementing a look ahead window;
    a first video encoder device;
    a second video encoder device;
    an information processing device;
    a means for calculating a sufficient look ahead window for determining a size of said input buffer and correlating said size to a processing delay;
    a means for simultaneously feeding, in real-time, a sequence of incoming video frames to said input buffer and first video encoder device;
    said information processing device continuously collecting information, in real time, on the statistics and rate-quality characteristics of a sequence of input video frames within said look ahead window from an output of said first video encoder device;
    said information processing device further jointly determining an optimal target bit allocation of all frames in the look ahead window based on information collected from said first encoder device and the available bit budget for said all frames in said look ahead window;
    means for instructing said second video encoder device to encode said incoming frames according to said jointly determined target bit allocation, said second video encoder for encoding the incoming sequence of frames according to coding instructions,
    means for continuously updating the said look ahead window by removing the current frame encoded to said second encoder device with a next frame from said sequence and by repeating of said look ahead window calculating through said second encoder device encoding,
    wherein said input buffer means implements said correlated processing time delay of time such that sufficient information may be collected from the output of said first video encoder device for deriving said jointly determined target bit allocation by said information processing device.

2. The system as claimed in claim 1, wherein said information collected relates to past, current and future input video frames comprising said sequence.

3. The system as claimed in claim 1, further including means for calculating a dynamic weighted picture complexity defined as a function of motion magnitude and picture quality index.

4. The system as claimed in claim 1, further including means for implementing rate control scheme to prevent underflow or overflow of a decode buffer requirement implemented according to a MPEG-2 standard, wherein the rate control scheme implements steps for adjusting the target bit allocation to prevent said decode buffer underflow or overflow.

5. The system as claimed in claim 1, wherein said first encoder device collects direct video frame signal information and intermediate results in various frame encoding stages under same encoding operation conditions as employed by said second encoder device.

6. The system as claimed in claim 5, wherein said first and second encoder devices operate at the same constant bit rate (CBR).

* * * * *